Aug. 16, 1966     D. P. HASS ETAL     3,266,715

MECHANICAL-FLUID ENERGY CONVERTING MEANS

Filed Dec. 30, 1963     3 Sheets-Sheet 1

INVENTORS
DAVID P. HASS
SIDNEY OLDBERG
SUNE TIMOUR
BY Woodhams, Blanchard & Flynn
ATTORNEYS

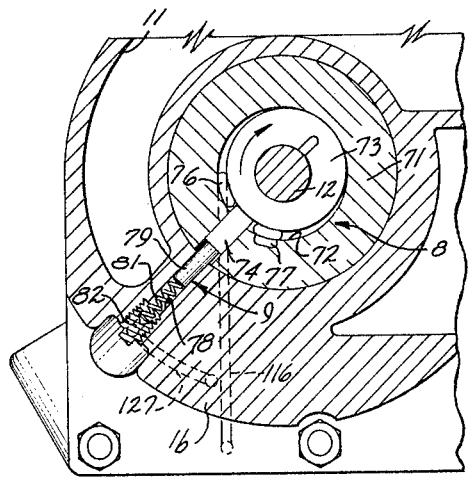

United States Patent Office 3,266,715
Patented August 16, 1966

3,266,715
MECHANICAL-FLUID ENERGY CONVERTING MEANS
David P. Hass, Detroit, Sidney Oldberg, Birmingham, and Sune Timour, Garden City, Mich., assignors to Eaton Yale & Towne Inc., a corporation of Ohio
Filed Dec. 30, 1963, Ser. No. 334,374
16 Claims. (Cl. 230—15)

This invention relates to means for converting mechanical energy to fluid energy, or vice versa, in a first system and particularly to such means wherein a controllable fluid pressure in a second system can be utilized to activate or inactivate the first system apparatus.

The present invention arose out of a desire to provide a compressor unit for handling Freon in an automotive air conditioning system. Accordingly, the specific embodiment herein selected for illustrative purposes is such a unit and the accompanying drawings and hereinafter following specification will refer specifically to such unit for illustrative purposes. However, it will be readily recognized and clearly understood that many of the principles of the invention are applicable to the imparting of energy into other fluids, both elastic and inelastic, and further that several of the broader features of the invention will be applicable to devices wherein fluid energy is converted to mechanical energy. Therefore, it will be understood that except where otherwise indicated by the context, the specific references hereinafter appearing to an automotive compressor of the type indicated are for convenience in description and therefore illustrative only and not limiting.

In presently known automotive air conditioning systems, and other fluid compressors or pumps of generally similar use and requirements, a basic problem in their design, operation and maintenance arises from the fact that these compressors are not only subjected to an intermittent on-off type of operation but that, even more serious, they are in the colder climates subject to long periods of complete inactivity. The clutching system required in present units because of the on-off type of operation is usually a separate clutch attached to the input of the compressor and located in a power train between a suitable source of rotative mechanical input power and the input shaft of the compressor. This need for a separate clutch associated with the compressor is not only costly in its original manufacture but it utilizes a substantial amount of space.

Further, these compressors are usually operated at a high frequency of reciprocation and hence, since they are often mounted directly on the engine block, they sometimes create a considerable amount of vibration superimposed upon the normal vibration of the engine. Particularly, since the compressor crankshaft is usually positioned parallel with the engine crankshaft for ease of power transmission thereto by a conventional belt means and usually for accommodation to space requirements is located in an offset position with respect to the crankshaft of the engine, the reciprocations of the compressor piston and connecting rod often set up an oscillating motion of the engine block which tends to be transmitted to the automotive frame either through the engine mountings or through the drive line.

Still further, the characteristics of the conventional reciprocating type of compressor are such that such compressor develops a maximum, or peak, pressure substantially in excess of the average pressure delivered as the output of compressor, which requires a heavier construction throughout all pressure resisting parts than is desirable. This effect is at least in part due to the relatively small discharge valve areas found in conventional compressors.

Accordingly, the objects of the invention are:
(1) To provide an energy converting unit applicable to a sufficiently wide variety of uses, both for converting mechanical to fluid energy and for converting fluid energy to mechanical energy, that a manufacturing company having such a unit in production for one purpose can by relatively simple design changes readily convert a given unit to other purposes whereby to provide a highly versatile product capable of a wide range of applications without requiring excessive design changes from one use to another.

(2) To provide such a device particularly applicable as a compressor for a refrigerant gas, such as Freon, in an automotive air conditioning system.

(3) To provide a device, as aforesaid, having a clutch by which same is connected or disconnected in relationship to a source of rotating mechanical power which is operating whenever the automotive engine is running.

(4) To provide a device, as aforesaid, wherein said clutch is built into the compressor housing in such a manner as to require a minimum of additional space whereby to reduce as compared to prior-known devices the space required for such a compressor unit.

(5) To provide a device, as aforesaid, in which the combination of the clutch and compressor into a single compact unit will substantially reduce the manufacturing cost of a compressor and clutch package.

(6) To provide a device, as aforesaid, whose shaft can be caused to rotate at all times that the automotive engine is running whereby to prevent the oil and fluid seals therein from drying and cracking, to prevent the bearing and sealing surfaces from corroding and to prevent other known deleterious effects commonly resulting from such equipment standing idle over extended periods of time.

(7) To provide a device, as aforesaid, which can be mounted with its mainshaft parallel with the crankshaft of the automotive engine, whereby to facilitate driving of same by a belt from said crankshaft, but wherein the reciprocating movement of the reciprocating part is parallel with said shafts, whereby to eliminate the oscillatory vibration of the engine abovementioned, to render it immaterial where on the engine block said compressor is located and to minimize the likelihood of vibration from said compressor being transmitted to the frame of the vehicle.

(8) To provide a device, as aforesaid, having sufficiently simple parts that same can be made of quality materials and with high-grade workmanship without excessively advancing the cost of the final product.

(9) To provide apparatus, as aforesaid, which is capable of a long operating life, even under on-off operating conditions, with a minimum of maintenance and which further will be of a sufficient mechanical simplicity that if maintenance is required it can be provided easily, quickly and inexpensively.

(10) To provide a device, as aforesaid, controlled by the fluid pressure which in turn can be readily controlled as desired by mechanical means or by electrical means.

(11) To provide a device, as aforesaid, wherein the peak pressures developed within the compressor to maintain a given output discharge pressure are considerably less than the peak pressures required in presently known conventional compressors for maintaining said given discharge pressure.

(12) To provide a device, as aforesaid, which will reduce the torque loads applied to the input driveshaft of the compressor as compared to the corresponding loads on the crankshaft of a conventional reciprocating compressor, whereby to reduce both the size of the shaft required and also the size of the bearings and housing required to accommodate such shaft.

(13) To provide a device, as aforesaid, which permits valve openings of substantially larger size for a given piston displacement than is possible in conventional compressors having a radially reciprocating piston.

Other objects and purposes of the invention will be apparent to persons acquainted with devices of this general type upon reading the following specification and inspecting the accompanying drawings.

In the drawings:

FIGURE 3 is a section taken on the line III—III of FIGURE 2.

FIGURE 4 is a section taken on the line IV—IV of FIGURE 2.

FIGURE 5 is a section taken on the line V—V of FIGURE 2.

FIGURE 6 is a side elevational view of the piston and parts associated therewith of FIGURE 2.

FIGURE 7 is a section taken on the line VII—VII of FIGURE 6.

FIGURE 8 is a partially broken end elevational view of one-half of a slipper ring of FIGURE 6.

FIGURE 9 is a section taken on the line IX—IX of FIGURE 8.

FIGURE 10 is a top view of the slipper half of FIGURE 8.

*General description*

In general the apparatus of the invention comprises a rotatable shaft and a piston splined to said shaft for rotation therewith but for reciprocable movement axially thereof. Housing means are provided surrounding said piston for defining a chamber within which said piston reciprocates and suitable valve means are provided in communication with said chamber for supplying fluid to said chamber and conducting fluid away from said chamber. In a preferred embodiment of the apparatus, dual chamber means and valves related to each thereof are provided in association with each end of said piston.

Cam and cam follower means are provided between said piston and the frame of the apparatus which when activated effect reciprocation of said piston simultaneously with the rotation thereof and which when deactivated permit said piston to rotate with said shaft without being reciprocated with respect thereto. Such means may include a fluid operated brake, responsive to the presence or absence of a secondary fluid pressure, and which in one condition holds said cam follower fixed with respect to the housing means or in another condition permits same to follow the rotation of said piston without otherwise acting thereon. Said secondary fluid pressure may then be imposed or removed in any convenient manner but in the preferred embodiment hereinafter set forth, said secondary fluid pressure is provided by an independent pump provided within the same housing running from the same shaft as the rest of the compressor unit.

Said apparatus can be adapted for pumping a non-compressible fluid with only minor, mostly dimensional, changes and at least the broader principles of the invention may be applied in the design of a motor for converting fluid energy to mechanical energy.

*Detailed description*

In the following description certain terminology will be used for convenience in reference but same will be understood as being used solely for convenience in reference and as having no limiting significance. For example, the terms "upwardly," "downwardly," "rightwardly" and "leftwardly" will refer to directions in the figures of the drawings in connection with which said terminolgy is used. The terms "inwardly" and "outwardly" will refer to directions toward and away from the geometric center of the apparatus. Said terminology will include the words specifically mentioned above, derivatives thereof and words of similar import.

Figure 2:
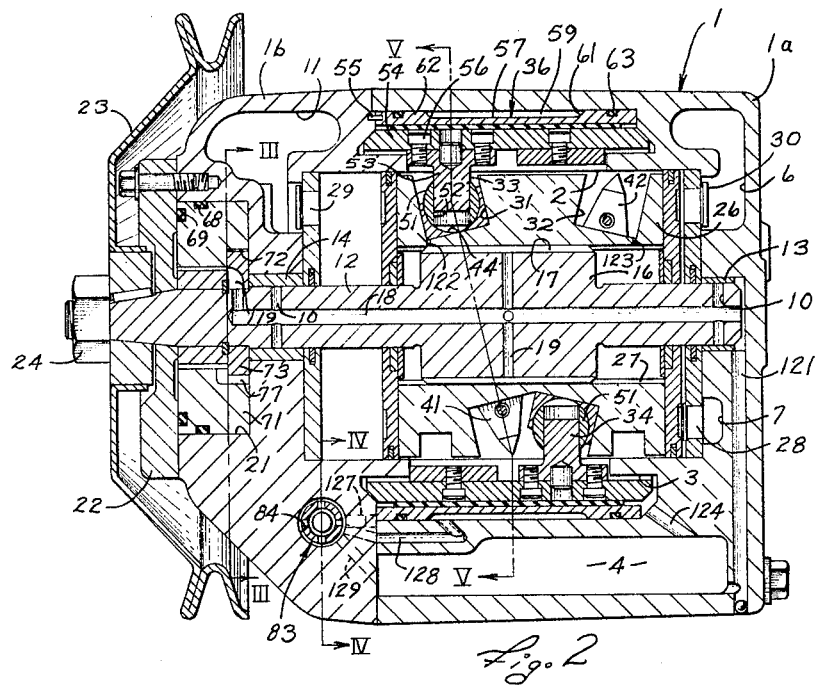
FIGURE 2 is a section taken on the line II—II of FIGURE 1.
Figure 1:
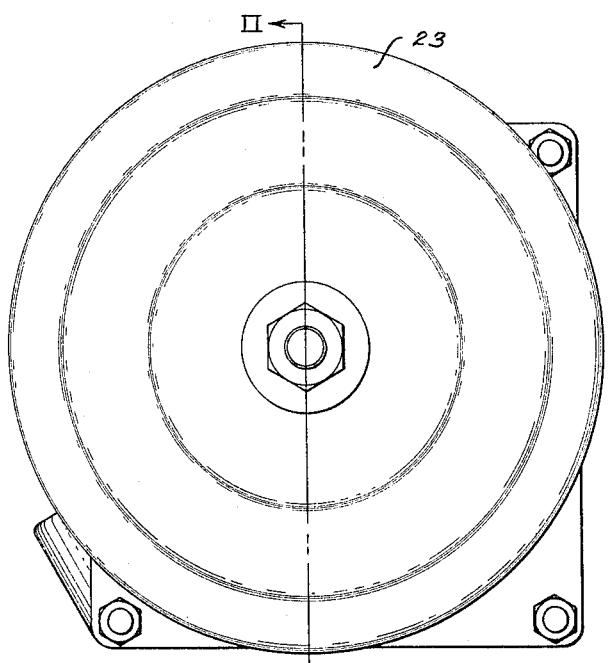
FIGURE 1 is an end elevational view from the driving or pulley end of a unit embodying the invention.

Referring now to FIGURE 2, there is shown a housing 1 consisting, in this embodiment, of a generally cup-shaped portion 1a and a cover portion 1b. Said cup-shaped portion 1a provides an internal, generally cylindrical, pressure chamber 2. An annular control chamber 3 is arranged immediately outwardly of said pressure chamber 2 and an oil sump 4 is located in the lowermost part of the housing 1. Valve conduits 6 and 7 are provided in the rightward end of the housing 1 and in communication with the pressure chamber 2.

The cover portion 1b closes the open side of the cup-shaped portion 1a and provides a housing for a lubricating pump 8 (FIGURE 3) and for a positive displacement pump 9. There is also provided in this embodiment further pressure fluid passageways of which one is shown at 11 corresponding to the passageways 6 and 7 when the unit is utilized, as it is here, as a double-ended or double-acting pump.

A shaft 12 extends coaxially through the pressure chamber 2 and is supported at its respective ends by bearings of any convenient kind, such as the sleeve bearings shown at 13 and 14 (FIGURE 2). The central portion of said shaft 12 is preferably enlarged as shown here at 16 and said enlarged part is externally splined at 17. Said shaft has a central passageway 18 therethrough for lubricating purposes, as hereinafter discussed, which communicates with a radial passageway 19. The central passageway 18 also communicates through bearing lubrication passages 10 with the bearings 13 and 14. A recess 21 at the leftward end of the cover 1b receives the pump assemblies 8 and 9 as detailed further hereinafter and said recess 21 is closed by a plate 22 through which the shaft 12 extends. Drive receiving means, here a pulley 23, is mounted at the leftward end of said shaft 12 and is held in place by any convenient means, here a nut 24.

A piston 26 is internally splined at 27 for interengaging the spline 17 on the shaft enlargement 16 to support said piston 26 on the shaft 12 for axial reciprocation with respect thereto but for rotation therewith. Valve units of any suitable type are supplied at 28, 29 and 30 in any conventional manner to effect the desired pumping or compressing action in response to axial reciprocation of the piston 26. Since these valve units and the arrangement thereof may be conventional, further description of same is unnecessary and will be omitted.

Said piston 26 is provided, externally in this embodiment, with at least one, here two, angling grooves 31 and 32 which cooperate with a pair of cam elements 33 and 34, respectively. Said cam elements are mounted in cooperation with a brake unit 36 so that when they are held against rotation with respect to the housing 1, said piston 26 will be caused to reciprocate axially and when said brake unit 36 is released, said cam elements 33 and 34 will rotate with said piston 26 and the piston 26 will not reciprocate. Said brake unit 36 responds to fluid pressure furnished in this embodiment from the positive displacement pump 9 as hereinafter described.

Turning now to the piston and cam structure in more detail, FIGURES 6 and 7 show the piston 26 removed from the housing 1 for increased clarity. Said piston 26 has within its grooves 31 and 32, respectively a pair of slipper rings 41 and 42. These rings may be any of many specific designs but the design hereinafter described and illustrated in the drawings has been found advantageous and will sufficiently illustrate this aspect of the invention. The slipper rings 41 and 42 may be, and in this embodiment are, identical and, thus, only the slipper ring 41 is described.

Referring now to FIGURES 7 and 8, said slipper ring 41 is composed of two parts indicated at 41a and 41b, Said parts are mirror images of each other and hence a description of one will suffice to describe both. The part 41a defines somewhat more than 180 degrees of an annulus. Said part 41a has a first portion 45 of thickness equal to the full thickness of the combined slipper assembly 41 and a portion 43 of half of said thickness. A semispherical recess 44 is provided in the part 43, the edge 44a thereof defining more than 180 degrees of an arc as shown in FIGURE 8 and the edge defined by the cutting plane IX—IX in FIGURE 8 defining more than 90 degrees as shown in FIGURE 9.

Thus, when the two mating parts 41a and 41b are assembled together (FIGURES 2 and 5), a ball placed within the opening defined by the recesses 44 of both said mating parts will be held firmly against escape therefrom. A chordal opening 46 is provided through the bottom of the slipper ring 41 whereby the lower ends of the parts 41a and 41b may be held together by a suitable bolt 47 and nut 48. The walls of the grooves 31 and 32 maintain the portions 43 of the slipper rings in contact.

The two slipper rings 41 and 42 are placed diametrically of each other on the piston 26 so that the load applied to the piston by the hereinafter-described connections to said slipper rings 41 and 42 will be equalized.

A ball 15 is pivotally held within the recess 44 of the slipper 41 by the contour of said recess 44 and said ball 51 in turn acts to connect the upper part of the two halves 41a and 41b of the slipper ring 41. Said ball 51 has a radial, cylindrical opening therein which receives a post 53. The slipper ring 41, ball 51 and post 53 comprise the hereinabove-described camming element 33 and the slipper ring 42 with its associated ball 51 and post 53 comprise the camming element 34.

Both said posts 53 are connected to a ring or drum 54, in this embodiment by screws of which one is indicated at 56. Said drum 54 is surrounded by a contractible band 57, here continuous, one end of which is anchored at 55 against circumferential movement with respect to the housing 1. A band 58 of friction material, such as ordinary brake lining material, is affixed to either the drum 54 or the band 57, usually the drum 54, for reasons of convenience in handling. The brake mechanism 36 hereinabove mentioned thus includes the drum 54, contractible band 57 and friction material 58. A pressure fluid chamber 59 surrounds the contractible band 57 by which pressure fluid introduced thereinto under sufficient pressure can contract said band 57 onto the drum 54 and prevent rotation thereof with respect to the housing 1. It will be observed in FIGURE 2 that the edges 61 and 62 of said contractible band 57 are sealed in any convenient manner, such as by O-rings of which one is shown at 63 to prevent the axial escape of pressure fluid from out of the chamber 59.

While the pressure fluid applied to the chamber 59 for controlling said brake mechanism 36 may come from any convenient and controllable source, including a source external of the compressor apparatus such as the lubricating system of the automotive engine with which the compressor is used, the more specific objectives and resulting advantages of the invention contemplate the economy and compactness of having a pressure source contained within the compressor unit itself. The specific embodiment herein chosen to illustrate the invention is therefore shown as containing the lubricating pump 8 and positive displacement pump 9, both above briefly mentioned and now further described.

Referring first to the lubricating pump 8 (FIGURE 3), the aforementioned recess 21 receives an annular pump housing 71 defining an internal chamber 72 concentric with the shaft 12. Any convenient sealing means, here including O-rings 68 and 69 are seated by the housing 71 against the cover 16 and plate 22. An eccentric impeller 73 is fixed for rotation on and with said shaft 12 and operates within said central chamber 72. A vane 74 rides on the eccentric 73 in any conventional manner for dividing the inlet zone from the discharge zone. An inlet passageway 76 communicates to the chamber 72 on the inlet side of the vane 74 and a discharge passageway 77 provides communication from said chamber on the discharge side of said vane 74. This type of pump is old and well known and is described herein in detail only to show its manner of operation with the rest of the apparatus.

Also provided within the housing of the cover 1b is the positive displacement pump 9 operated in this embodiment directly from and by the reciprocation of the vane 74. A cylindrical opening 78 is drilled into the side of the cover 1b and contains reciprocably therein a plunger 79 which bears against the vane 74. A spring 81 held in place by a suitable threaded closure 82 holds said plunger 79 at all times solidly against the vane 74. Thus, rotation of the shaft 12 effects operation both of the lubricating pump 8 and of the positive displacement pump 9. A suitable conduit communicates with the opening 78, as hereinafter described in more detail, for further carrying out the purposes of said positive displacement pump 9.

The valves required for the structure herein described may advantageously be provided in a single unit indicated generally at 83 and best shown in FIGURE 4. While it is not essential for purposes of the invention that said valves all be provided by a single unit as herein shown, same is advantageous and constitutes one of the advantages of the invention.

Referring now to FIGURE 4, there is provided a valve opening 84 in the cover 1b for receiving the valve unit 83 and coaxial therewith a solenoid opening 86 for receiving the hereinafter-described actuating solenoid. Within said valve opening 84 there is provided a housing 87 containing a pair of spaced valve seats 88 and 89, said seats having positioned thereon ball check valves 91 and 92, respectively. High pressure ports 93 communicate through the wall of the chamber 94 behind the ball 92, valve ports 96 communicate into the side of the chamber 97 behind the ball 91 and passageways 98 and 99 are provided at the respective ends of said valve unit connection 83 as hereinafter further described. A plug 101 is threaded into the leftward end of the housing 87 for defining the valve seat 89 and said plug 101 and housing 87 may be held in place by any convenient means, such as a snap ring 102.

The solenoid control means 103 is inserted into the opening 86 and in response to electric potential placed across a pair of leads 104 and 106 actuates a plunger 107 which in turn moves when energized against a return spring 108 to place a valve 109 against a seat 111 for closing the passageway 98. The solenoid control means 103 may be held within the opening 86 by any convenient means here including a snap ring 112. Suitable sealing means such as the O-rings 113 prevent leakage of the passages communicating with the valve unit 83 at the point of said communication.

The various passageways which are provided through housing 1 may be provided in any conventional manner. For illustration, said passages are indicated with either solid or broken lines in FIGURES 2, 3 and 4. However, a better understanding of the various connections and the relationship between the several parts will be obtained by reference to FIGURE 11 with the understanding that the passageways indicated as existing between the several parts therein shown are provided within the housing 1 in any convenient and desired manner.

Figure 11:
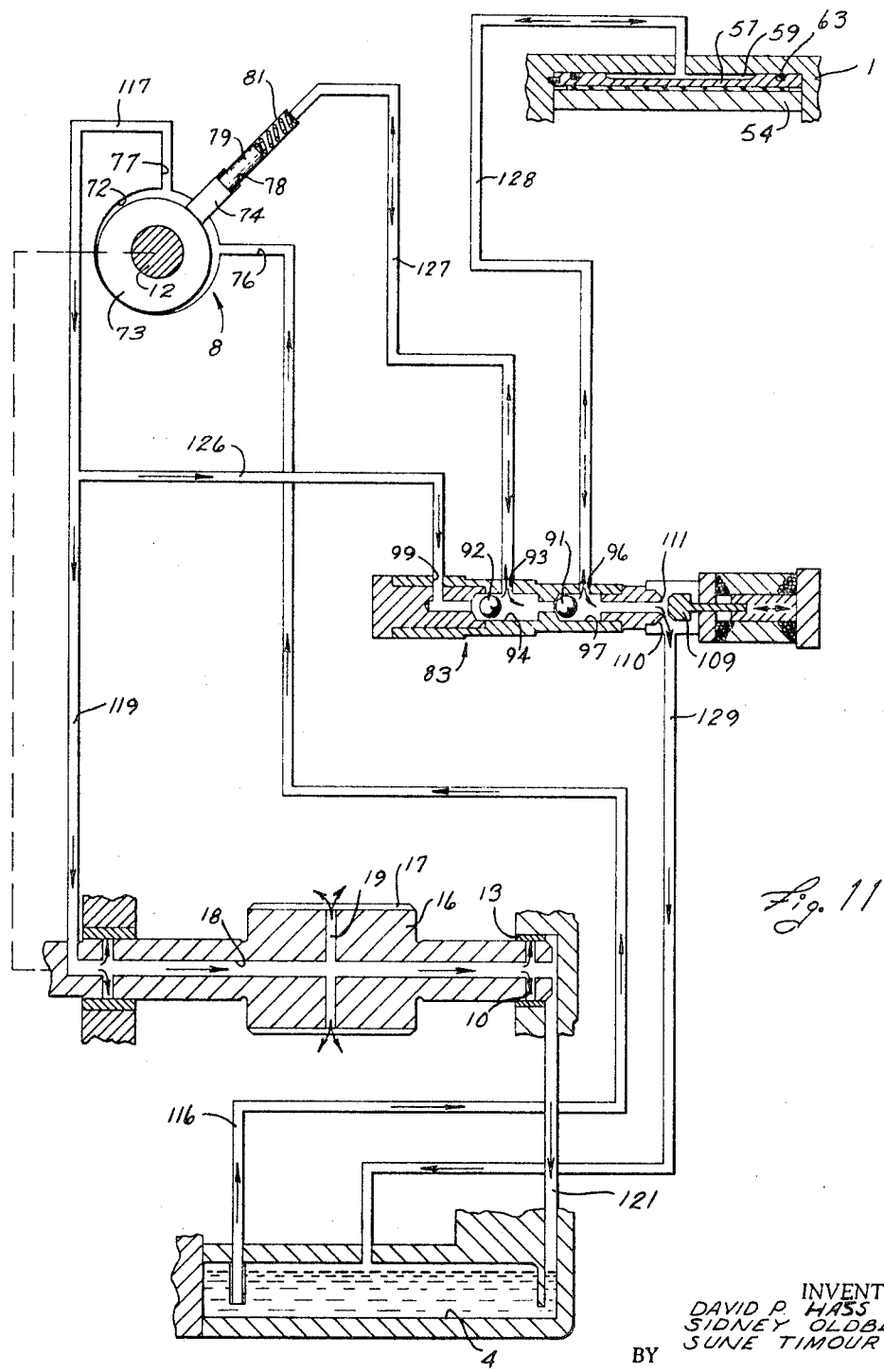
FIGURE 11 is a schematic diagram of the fluid system of the unit of FIGURE 1.

Referring now to FIGURE 11, the several operating parts of the presently described mechanism appear therein and are identified by the numbers already utilized for designating said parts and further description thereof will be unnecessary.

Commencing with the oil sump 4, a conduit 116 connects same to the inlet 76 of the lubricating pump unit 8. The discharge port 77 is connected by a passageway 117 to a dividing point 118 from which a further passageway 119 connects to the central passageway 18 at one end (leftward as appearing in the drawings) of the shaft 12.

Discharge from the other end of said shaft 12 is connected by a passageway 121 back to the oil sump 4.

From the central passageway 18 in the shaft 12, the radial passageways 19 lead into the area of the splines 17. Because of the reciprocable movement and the reversal of torque between the piston 26 and the enlarged portion 16 of the shaft 12, oil will work lengthwise along the splines 17 and reach small openings 122 and 123 adjacent remote and radially inward corners of the respective grooves 31 and 32. Centrifugal force will then cause oil entering these openings 122 and 123 to move radially outwardly therethrough into said respective grooves 31 and 32 and along the walls thereof to lubricate the slipper rings 41 and 42 and to work into and between the parts of said slipper rings 41 and 42 to lubricate the ball 51 associated therewith. Such oil will then return to the bottom of the opening 3 and return by a passageway 124 (FIGURE 2) to the sump 4.

Returning now to the junction point 118 (FIGURE 11), a passageway 126 extends therefrom to the inlet passageway 99 of the valve unit 83. The high pressure port 93 of said valve unit 83 is connected by a passageway 127 to the opening 78 within which there is located the positive displacement pump unit 9. The chamber 97 of the valve unit 83 connects through the valve port 96 to a conduit 128 which connects, in turn to the chamber 59 for operating the contractible clutch band 57. A passageway 129 extends from the chamber 110 back to the sump 4.

Operation

The operation of the apparatus has been somewhat indicated in the foregoing description but will be reviewed to assure a complete understanding of the invention.

Continuing the assumption that the apparatus is utilized in an automotive engine for compressing refrigerating fluid for an automotive air conditioning unit, the unit is preferably bolted rigidly to the engine block with its shaft 12 parallel with the engine crankshaft and with the drive pulley 23 properly aligned with suitable belt drive means from said engine. Thus, the pulley 23 and shaft 12 will rotate continuously whenever the automotive engine is in operation. Inasmuch as the lubricating pump unit 8 is mounted directly upon said shaft 12, its impeller 73 will rotate whenever said shaft 12 is rotating and since the plunger 79 is held constantly against the vane 74 by the spring 81, said plunger 79 will reciprocate whenever said shaft 12 is rotating. Thus, all of these parts are operating constantly whenever the automotive engine is operating and, as a result, they are therefore kept well lubricated and in good operating condition even during long periods of inactivity of the air conditioning apparatus as such.

Operation of the lubricating pump unit 8 will, as above indicated, impel lubricating oil through the passageways 117 and 119 to the central passageway 18 of the shaft 12 and therefrom into the bearing lubrication passages 10 in a conventional manner to lubricate the bearings 13 and 14 on which said shaft 12 is mounted.

The path of oil through the radial passageway 19 into the slipper and cam assembly has been described above and further description is not required. The lubricating pump unit 8 also supplies oil through the passageways 117 and 126 to the inlet passageway 99 of the valve unit 83 and such oil thus appears under the pressure of the lubricating pump unit 8 within the chamber 94. This introduction of oil under some initial pressure into the chamber 94 assists the positive displacement pump unit 9 to provide the desired high pressure within the clutch chamber 59. It is conceivable, however, that under some circumstances where this high pressure is not required, oil may be drawn directly from the sump 4 into the chamber 94.

Retraction of the plunger 79 of the positive displacement pump 9 will, in a conventional manner, allow pressure fluid in the inlet passageway 99 through the ball valve 92 into the chamber 94 and draw a suitable amount of pressure fluid, here oil, from the chamber 94. The subsequent advance of said plunger 79 will drive said pressure fluid through the ball valve 91 and into the chamber 97. If the solenoid unit 103 is de-energized, the pressure fluid from the chamber 97 will merely exit therefrom and in the embodiment here shown will return to the sump 4 by way of the passageway 129. Thus, the contractible clutch band 57 is de-energized and the drum 54 is free to rotate with the piston 26. Thus, said piston 26 merely rotates with the shaft 12 and nothing further happens.

However, when the solenoid 103 is energized, it advances the valve 109 against the valve seat 111 and prevents the pressure fluid return above mentioned. Thus, pressure fluid within the chamber 97 will travel by the passageway 128 to the clutch chamber 59 and there effect contraction of the band 57 and the friction material 58 against the drum 54. This stops the rotation of said drum 54 and holds the balls 51 associated therewith against rotation with said piston 26. This holds the slipper rings 41 and 42 similarly against rotation with the shaft 12 and thus through the angular positioning of the grooves 31 and 32, respectively, said piston 26 is caused to reciprocate with respect to the shaft 12. This acts through the valving at either or both ends of the chamber 2 in any conventional manner to effect the desired pumping action. Said valving and passageways associated therewith form no part of the present invention and hence are not disclosed in detail, but the valves at one end of said chamber are indicated generally at 28 and 30 and one of the valves at the opposite end of the chamber is indicated at 29.

Thus, the pumping action of the unit will respond immediately and accurately to energizing of the electrical connections 104 and 106 but the running parts will at all times be properly lubricated as above mentioned and independently of the state of energization of the connections 104 and 106.

Is has been assumed throughout the foregoing discussion that lubricating oil would be the pressure fluid to be introduced into the clutch chamber 59 and such will be the case where the same is intermittently connected, as in the present embodiment, with the lubricating pump 8. However, it will be recognized that by utilizing a pressure fluid source different from the lubricating pump 8 and/or sump 4, or even, further, driving the high pressure pump 9 independently of the lubricating pump 8, a pressure system may be provided for supplying the clutch chamber 59 which is completely independent of the lubrication system and, if desired in such case, types of pressure fluid other than lubricating oil can be used.

Although a particular preferred embodiment of the invention has been described above for illustrative purposes it will be understood that variations or modifications of such disclosure which come within the scope of the appended claims, are fully contemplated.

What is claimed is:

1. In a fluid-mechanical energy converting device, the combination comprising:

housing means defining a chamber having inlet and outlet valves associated therewith;

a piston within said chamber and means supporting said piston for rotation and for reciprocation within said chamber;

means for rotating said piston and selectively actuatable drive mechanism for reciprocating said piston, said drive mechanism being couplable to said piston for being driven upon rotation of said piston, said drive mechanism having selectively actuable clutch means so that said piston must rotate and said clutch means must be clutched in order to reciprocate said piston; and control means for clutching and de-clutching said clutch means.

2. The device defined in claim 1 wherein said clutch means becomes clutched when in one condition of movability with respect to said housing means and ineffective when in another condition of movability with respect to said housing means and said control means acts to place said clutch means in one condition or the other with respect to said housing means.

3. The device defined in claim 1 wherein said drive mechanism is cammedly related to said piston whereby when said drive mechanism is immovable with respect to said housing means, said piston is caused to reciprocate and when said drive mechanism is movable with respect to said housing means, said drive mechanism is free to rotate with said piston and will not effect reciprocation of said piston, and said clutch means includes means for fixing said drive mechanism immovably with respect to said housing means and releasing said clutch means from said condition.

4. The device defined in claim 1 wherein said drive mechanism includes cam means cammedly related to said piston whereby when said drive mechanism is fixed with respect to said housing means and said piston is rotating it will effect reciprocation of said piston and when said drive mechanism is movable with respect to said housing means, it will move with the rotation of said piston and not effect such reciprocation, said clutch means including also frictional engagement means acting between said cam means and said housing means, said frictional engagement means in a first condition fixing said cam means immovably with respect to said housing means and in a second condition permitting movement of said cam means with respect to said housing means and with said piston; and said control means acting on said frictional engagement means for rendering same into the first condition or the second condition.

5. The device defined in claim 1 wherein said drive mechanism includes cam means cammedly related to said piston whereby when said drive mechanism is fixed with respect to said housing means and said piston is rotating it will effect reciprocation of said piston and when said drive mechanism is movable with respect to said housing means, it will move with the roation of said piston and not effect such reciprocation, said clutch means including frictional engagement means acting between said cam means and said housing means, said frictional engagement means in one condition fixing said cam means immovably with respect to said housing means and in another condition permitting movement of said cam means with respect to said housing means and with said piston; and said control means including fluid pressure means responsive to a fluid pressure for rendering said frictional engagement means in one condition or the other condition.

6. The device defined in claim 1 wherein said drive mechanism includes cam means related to said piston such that when said cam means is immovable with respect to said housing means said piston when rotating will be caused to reciprocate and when said cam means is movable with respect to said housing means, it will move with said rotating piston and not cause same to reciprocate;

wherein said clutch means includes a friction band surrounding and engageable with said cam means for engagement therewith and for preventing such movement of said cam means with respect to the housing means and releasable with respect thereto for permitting such movement of said cam means; and manually responsive means for applying and releasing said friction band.

7. The device defined in claim 1 wherein said drive mechanism includes cam means related to said piston such that when said cam means is immovable with respect to said housing means said piston when rotating will be caused to reciprocate and when said cam means is movable with respect to said housing means, it will move with said rotating piston and not cause same to reciprocate;

wherein said clutch means includes a friction band surrounding and engageable wtih said cam means for engagement therewith and for preventing such movement of said cam means with respect to the housing means and releasable with respect thereto for permitting such movement of said cam means;

said control means including means for applying a fluid pressure externally of said friction band which fluid pressure when in one on-off condition will apply said friction band and when in the other on-off condition will release said friction band; and means selecting the condition of said on-off means.

8. In a device for converting rotating mechanical energy to pressure energy, the combination comprising:

housing means defining a substantially cylindrical operating chamber;

a shaft rotatably mounted within said operating chamber, the axis of said shaft being parallel to the axis of said operating chamber;

a piston mounted on said shaft within said chamber and means drivingly connecting said piston to said shaft for rotation therewith and supporting said piston for free sliding movement axially with respect to said shaft;

cam means coupled to said piston for effecting reciprocation of said piston when same is being rotated by said shaft and said cam means is held against rotational movement with respect to said housing means, the cam means being free to rotate with said piston and thereby not cause reciprocation thereof when said cam means is rotatable with respect to said housing means;

a mechanical friction clutch concentric with and surrounding said cam means, said friction clutch being nonrotatable with respect to said housing means;

means defining a pressure fluid chamber externally of said friction clutch; and control means for introducing pressure fluid into and releasing same from said pressure fluid chamber.

9. The device defined in claim 8 including a positive displacement auxiliary pump positioned within said housing means and operable by said shaft; and means defining a passageway including a check valve conducting pressure fluid from said auxiliary pump to said pressure fluid chamber.

10. The device defined in claim 8 including a positive displacement first auxiliary pump positioned within said housing means and operable by said shaft;

means defining a passageway including a check valve conducting pressure fluid from said auxiliary pump to said pressure fluid chamber;

including also a second auxiliary pump and a pressure fluid system associated solely therewith for conducting lubricant from said second pump to the running parts of said piston and said cam means and returning same on said second auxiliary pump; and control fluid return means connecting a pressurized portion of said lubrication system to the inlet connection of said positive displacement pump.

11. In a mechanical-fluid energy converting device, the combination comprising:

a housing defining a generally cylindrical first pressure chamber;

a shaft extending rotatably and coaxially through said chamber and a piston mounted on said shaft for reciprocation with respect thereto and for rotation therewith;

selectably actuatable drive mechanism for reciprocating said piston when said shaft is rotating, said drive mechanism including cam means coupled to said piston and to said housing in such a manner that when said cam means are in one rotative-nonrotative condition with respect to said housing said piston is caused to reciprocate and rotate with said shaft and when said cam means are in another rotative-non-rotative condition with respect to said housing, said piston will rotate with said shaft, but not reciprocate;

fluid pressure operable clutch means for selectively and alternatively (1) fixing said cam means immovably with respect to said housing and (2) releasing said cam means for rotation with respect to said housing;

means defining a second pressure chamber within said housing and means reciprocably driven from said shaft and cooperating with said second chamber to provide a constantly running positive displacement pump;

a means defining passageway connecting the discharge of said pump to said fluid pressure responsive means;

valve means controlling said passageway in such a manner as to determine which of said conditions said cam means will occupy; and control means for said valve means.

12. The device defined in claim 11 including a second pump arranged within said housing and driven from said shaft and providing lubricating oil under pressure to the running parts of said piston and cam means.

13. The device defined in claim 11 including a second pump arranged within said housing and driven from said shaft and providing lubricating oil under pressure to the running parts of said piston and cam means; and a means defining passageway from the discharge of said second pump to the intake of said positive displacement pump.

14. The device defined in claim 8, in which said shaft has external splines and said piston has internal splines engaged with said external splines on said shaft whereby said piston is rotatable with and is movable axially along said shaft.

15. The device defined in claim 8, in which said piston has angled groove means in its periphery, said cam means projecting into said groove means, a drum concentric with said chamber and surrounding said cam means and means supporting said drum for rotation in said housing means, means connecting said cam means to said drum, a first band of friction material surrounding said drum, a contractible second band mounted on said housing and fixed against rotation with respect thereto, said second band surrounding said first band, said pressure fluid chamber surrounding said second band whereby supply of pressure fluid into the pressure fluid chamber causes contraction of said second band and thereby prevents rotation of said drum.

16. The device defined in claim 8, in which said shaft has a lengthwise extending central passageway therein having passage portions extending therefrom through the periphery of said shaft for supplying lubricant to said chamber, and a lubricant pump connected to said passageway.

References Cited by the Examiner
UNITED STATES PATENTS

| | | | |
|---|---|---|---|
| 630,977 | 8/1899 | Engarth | 103—157 |
| 1,005,763 | 10/1911 | Adams | 103—157 |
| 1,900,284 | 3/1933 | Herzmark | 230—13 |
| 2,422,972 | 6/1947 | Knowles | 230—147 |
| 2,661,696 | 12/1953 | Dale | 230—15 |
| 2,820,588 | 1/1958 | Penn et al. | 230—15 |
| 2,855,761 | 10/1958 | Jacobs | 230—15 |
| 2,905,098 | 9/1959 | Manelli | 103—175 |
| 2,961,151 | 11/1960 | Fabian | 230—15 |

MARK NEWMAN, *Primary Examiner.*
DONLEY J. STOCKING, *Examiner.*
W. L. FREEH, *Assistant Examiner.*